US006943801B2

(12) United States Patent
Rosenberg et al.

(10) Patent No.: US 6,943,801 B2
(45) Date of Patent: Sep. 13, 2005

(54) SYSTEM AND METHOD FOR REFRESHING IMAGING DEVICES OR DISPLAYS ON A PAGE-LEVEL BASIS

(76) Inventors: Scott A. Rosenberg, 875 Univ. Ave #9, Palo Alto, CA (US) 94301-2132; Sam W. Jensen, 8842 Winding Way #634, Fair Oaks, CA (US) 95628

( * ) Notice: Subject to any disclaimer, the term of this patent is extended or adjusted under 35 U.S.C. 154(b) by 53 days.

(21) Appl. No.: 09/540,166

(22) Filed: Mar. 31, 2000

(65) Prior Publication Data

US 2003/0020697 A1 Jan. 30, 2003

(51) Int. Cl.[7] .............................................. G06F 12/02

(52) U.S. Cl. ........................ 345/544; 345/204; 345/418; 345/530; 345/531; 345/536; 345/543; 345/547; 345/549; 345/589; 345/591; 345/593; 345/604

(58) Field of Search ................................ 345/204, 418, 345/530, 531, 536, 543, 544, 547, 549, 589, 591, 593, 604

(56) References Cited

U.S. PATENT DOCUMENTS 5,113,180 A * 5/1992 Gupta et al. ................ 345/542
5,136,695 A * 8/1992 Goldshlag et al. ........... 345/2.1
5,486,876 A * 1/1996 Lew et al. .................. 345/535
5,574,836 A * 11/1996 Broemmelsiek ............ 345/421
5,596,376 A * 1/1997 Howe ......................... 348/716
5,733,246 A * 3/1998 Forkey ........................ 348/70
5,748,178 A * 5/1998 Drewry ....................... 345/547
5,831,639 A * 11/1998 Conticello .................. 345/556
5,990,852 A * 11/1999 Szamrej ...................... 345/2.1
6,002,411 A * 12/1999 Dye ........................... 345/532
6,008,823 A * 12/1999 Rhoden et al. ............. 345/535
6,173,381 B1 * 1/2001 Dye ........................... 711/170
6,263,426 B1 * 7/2001 Abdallah et al. ........... 345/563
6,664,969 B1 * 12/2003 Emerson et al. ............ 345/544

* cited by examiner

*Primary Examiner*—Bipin Shalwala
*Assistant Examiner*—Vincent E. Kovalick
(74) *Attorney, Agent, or Firm*—Blakely, Sokoloff, Taylor & Zafman LLP

(57) ABSTRACT

The present invention provides a system and method for checking authorization of remote configuration operations. The method comprises storing at least one image frame such that content of the image frame is stored in a plurality of memory pages in a memory. The method further comprises sending the image frame to the display one memory page at a time to refresh the display.

13 Claims, 5 Drawing Sheets

SYSTEM AND METHOD FOR REFRESHING IMAGING DEVICES OR DISPLAYS ON A PAGE-LEVEL BASIS

BACKGROUND

1. Field

This invention generally relates to the field of cathode ray tubes (CRTs).

2. Background

Traditional display systems target a cathode ray tube (CRT) as their final imaging device. A CRT is typically updated in a raster fashion and require frequent refresh of the image being displayed in order to avoid perceived flickering by the user. Updating and refreshing the CRT in such manner is highly inefficient.

A new class of non-raster based imaging devices, including but not limited to liquid crystal displays (LCD), currently exists. These non-raster based imaging devices are typically "active matrix" devices, where pixels on the devices can be individual accessed and modified through the use of one or more switches at each pixel. The individual accessibility of pixels on these non-raster based imaging devices allows the pixels to be randomly turned on or off in a non-raster fashion. However, this updating and refreshing technique is inefficient as well.

DESCRIPTION

The present invention provides a system and method for refreshing imaging devices or displays on a page-level basis.

Figure 1A:
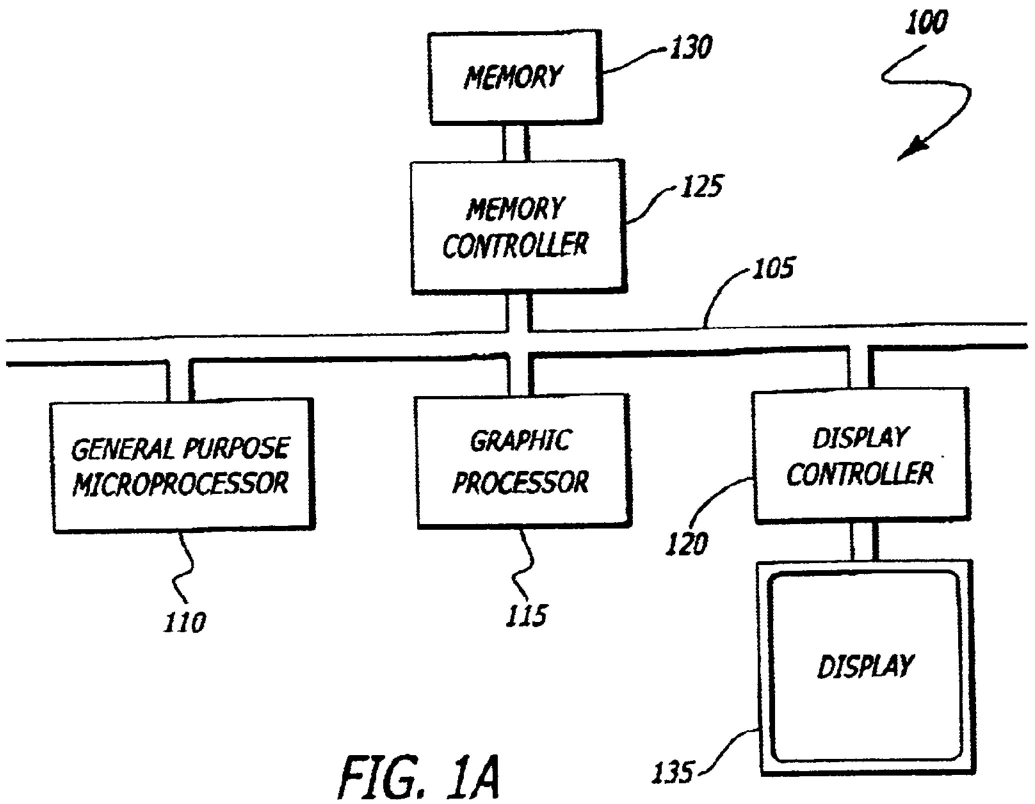
FIGS. 1A and 1B show exemplary systems in accordance with the current invention.
Figure 1B:
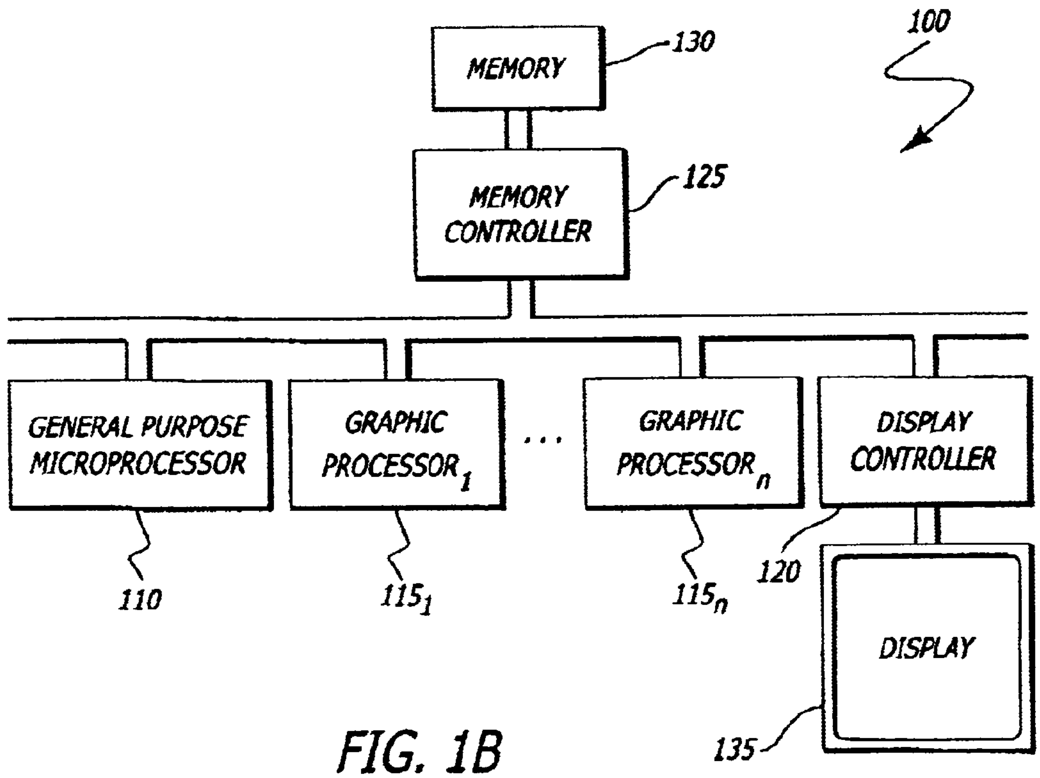

FIG. 1A shows an exemplary system in accordance with the current invention. The "system" includes, but is not limited or restricted to a computer (e.g., desktop, laptop, hand-held, etc.). The system 100 includes a bus 105 coupling together general purpose microprocessor 110, graphics processor 115, display controller 120, and memory controller 125. It should be noted that the system 100 can also include multiple graphics processors $\mathbf{115}_1 \ldots \mathbf{115}_N$ as shown in FIG. 1B, where "N" is a positive integer. Memory controller 125 is operatively coupled to memory 130 to control read and write accesses to memory 130. Display controller 120 is operatively coupled to image device or display 135 to control read and write accesses to imaging device or display 135.

The drawing of images or visual information can be performed by general purpose microprocessor 110, by graphics processor(s) 115, or by a combination of general purpose microprocessor 110 and graphics processor(s) 115. Representations of images or visual information are typically deposited into image frames stored in memory 130. As will be described later, memory 130 is divided into memory pages in support of well-known memory paging schemes. Display controller 120 periodically reads the image frames stored in memory 130 and sends these image frames to imaging device or display 135 for presentation.

Figure 2:
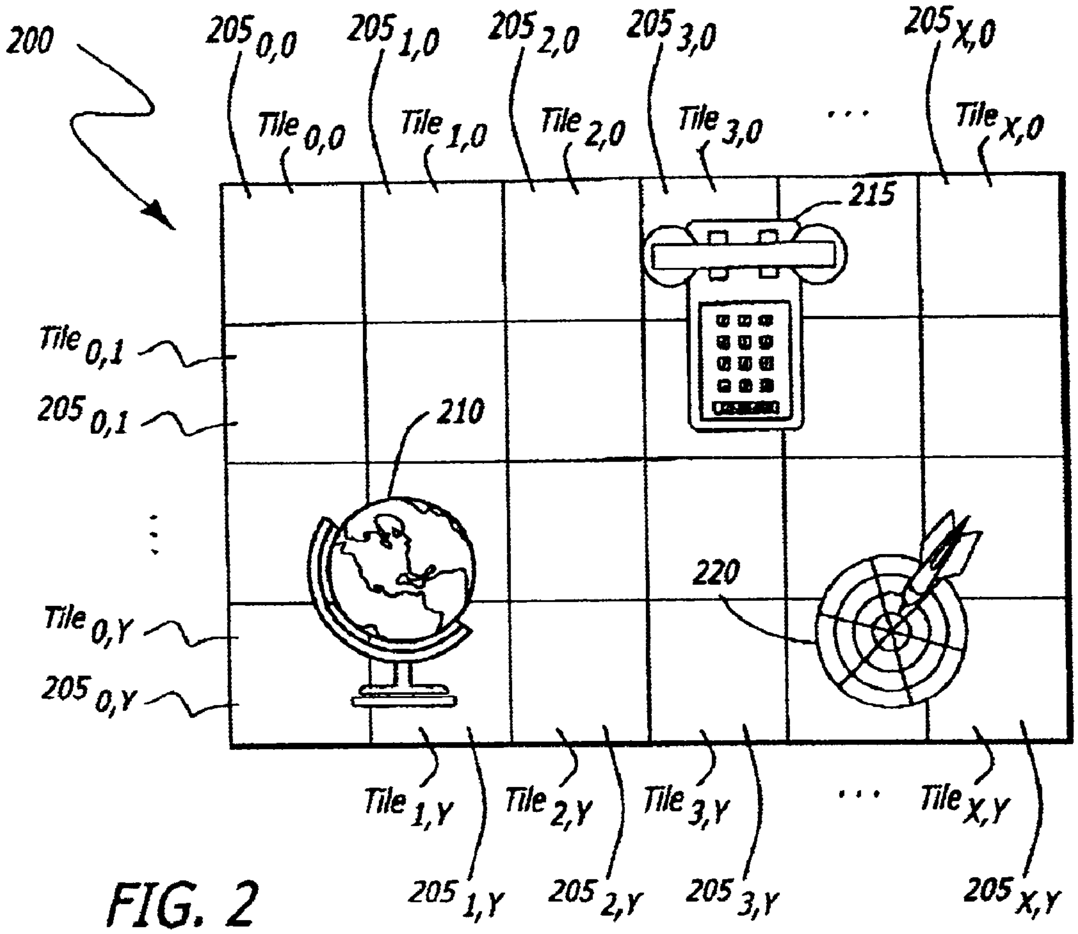
FIG. 2 shows an exemplary image frame.

FIG. 2 shows an exemplary image frame 200. The image frame 200 is typically divided into tiles $\mathbf{205}_{0,0} \ldots \mathbf{205}_{X,Y}$, where "X" and "Y" are positive integers. Each tile represents $\mathbf{205}_{0,0} \ldots \mathbf{205}_{X,Y}$ a two-dimensional region of pixels of the image frame. Images 210, 215, 220 can span over multiple tiles, as shown in FIG. 2. However, images can also be contained within a tile. In accordance with the present invention and as discussed below, the content of each tile $\mathbf{205}_{0,0} \ldots \mathbf{205}_{X,Y}$ is deposited in one memory page to take advantage of the spatial coherence generally demonstrated by drawing operations to improve the drawing speed. "Spatial coherence" refers to the concept that a drawing operation is more likely to create or modify a pixel that is close to the last pixel that was created or modified than to create or modify a randomly chosen pixel.

Figure 3A:
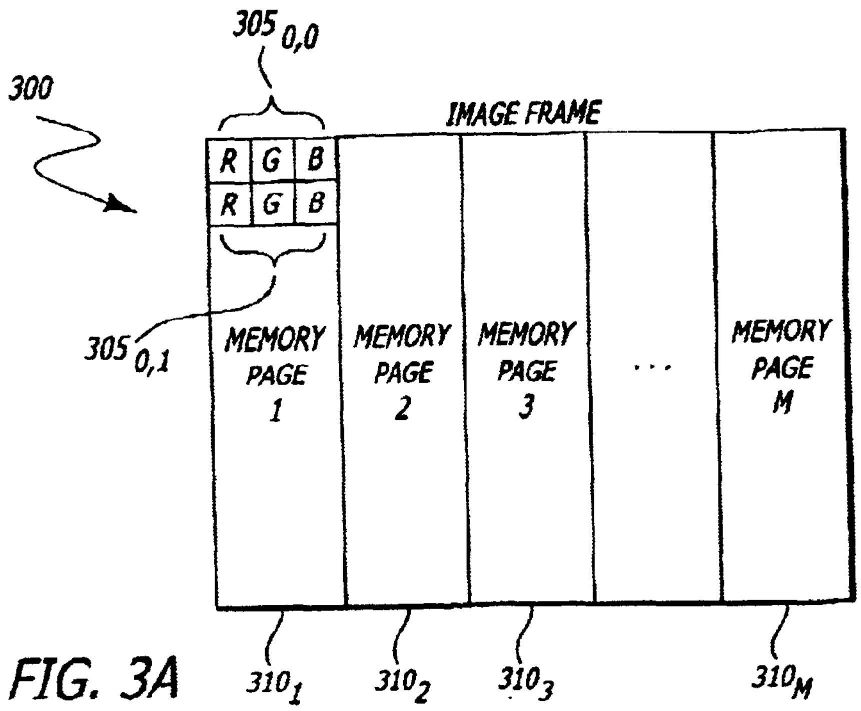
FIGS. 3A and 3B illustrate embodiments of memory configurations representing an image frame.

FIG. 3A illustrates one embodiment of a memory configuration representing an image frame 300. The illustrated memory configuration is referred to as the "Packed-RGB" configuration. As stated above and illustrated in FIG. 2, each image frame is divided into tiles. The content of each tile is stored in a memory page $\mathbf{310}_1, \mathbf{310}_2, \ldots, \mathbf{310}_M$, where "M" is a positive integer. In the Packed-RGB configuration, RGB-color components $\mathbf{305}_{0,0}$, $\mathbf{305}_{0,1}$ of one pixel are deposited or packed together in contiguous location in memory. Furthermore, color components of contiguous pixels of a tile are deposited or packed contiguously. For example, color components $\mathbf{305}_{0,0}$ of the pixel located at coordinate (0,1) of a tile can be stored in memory next to color components $\mathbf{305}_{0,1}$ of the pixel located at coordinate (0,0) of the same tile. In addition, color components of pixels located within one tile of the image frame are stored within the same memory page.

Figure 3B:
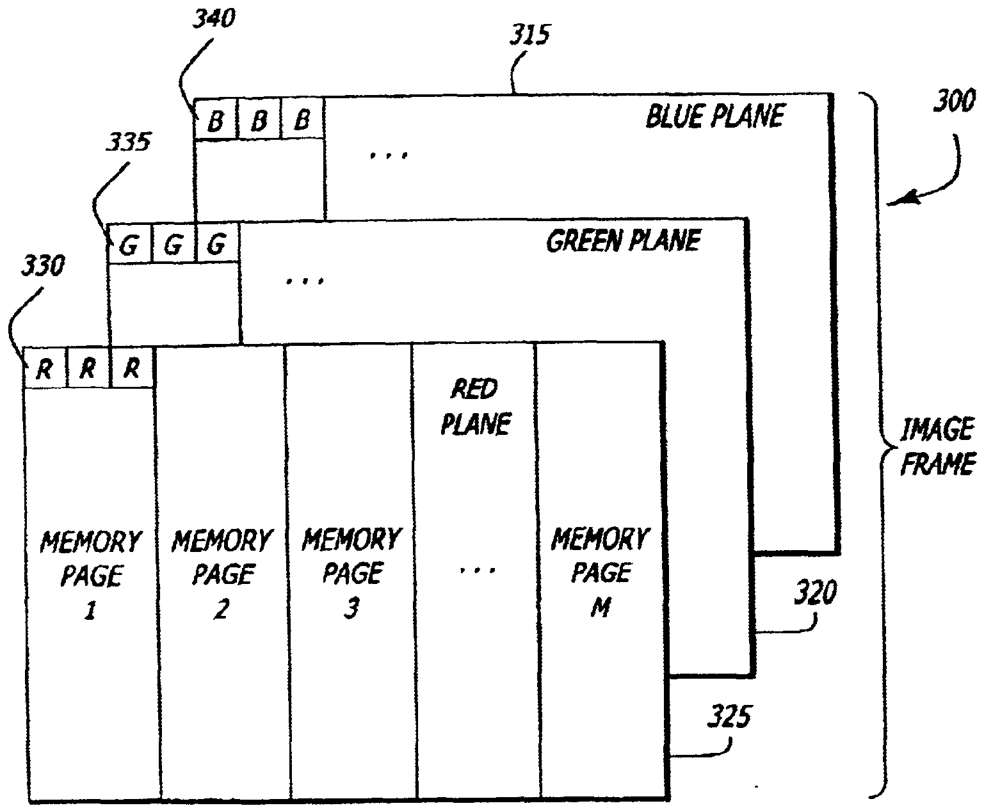

FIG. 3B illustrates an alternative embodiment of a memory configuration representing an image frame 300. The illustrated memory configuration is referred to as the "Multi-Plane" configuration. In the Multi-Plane configuration, the content of each image frame 300 is deposited in three color planes, including (1) red plane (R-plane) 315, (2) green plane (G-plane) 320, and (3) blue plane (B-plane) 325. RGB-color components of pixels are separated and deposited in corresponding color planes. Accordingly, red (R) components 330 are deposited in the R-plane 325; green (G) components 335 are deposited in the G-plane 320; and blue (B) components 340 are deposited in the B-plane 315.

Each color plane 315, 320, 325 includes multiple memory pages. As stated above and illustrated in FIGS. 2, each image frame is divided into tiles. The content of each tile is stored in a memory page. Furthermore, color components of contiguous pixels are deposited or packed contiguously in the appropriate color plane. In addition, color components of pixels located within one tile of the image frame are stored within the same memory page in the appropriate color plane.

In one embodiment, memory pages having a size of 4-Kilobyte (Kbyte) is employed. In this embodiment, each 4-Kbyte memory page can hold the content of tiles having a dimension of 64 pixels by 64 pixels. In this embodiment, accesses within a tile of 64 pixels by 64 pixels falls accordingly within the same memory page. It should be noted, however, that memory pages having sizes other than 4-Kbyte can be used.

As stated above and shown in FIGS. 1A and 1B, the drawing of images can be performed by general purpose microprocessor 110, by graphics processor(s) 115, or by the combination of microprocessor 110 and the graphics processor(s) 115. Representations of images or visual information are generated and deposited into image frames. Each image frame is divided into tiles. The content of each tile is stored in one memory page. Display controller 120 periodically reads the image frames and sends these image frames to the display or imaging device for presentation. Display controller 120 sends these image frames to the display one memory page at a time for efficiency purposes.

Figure 4:
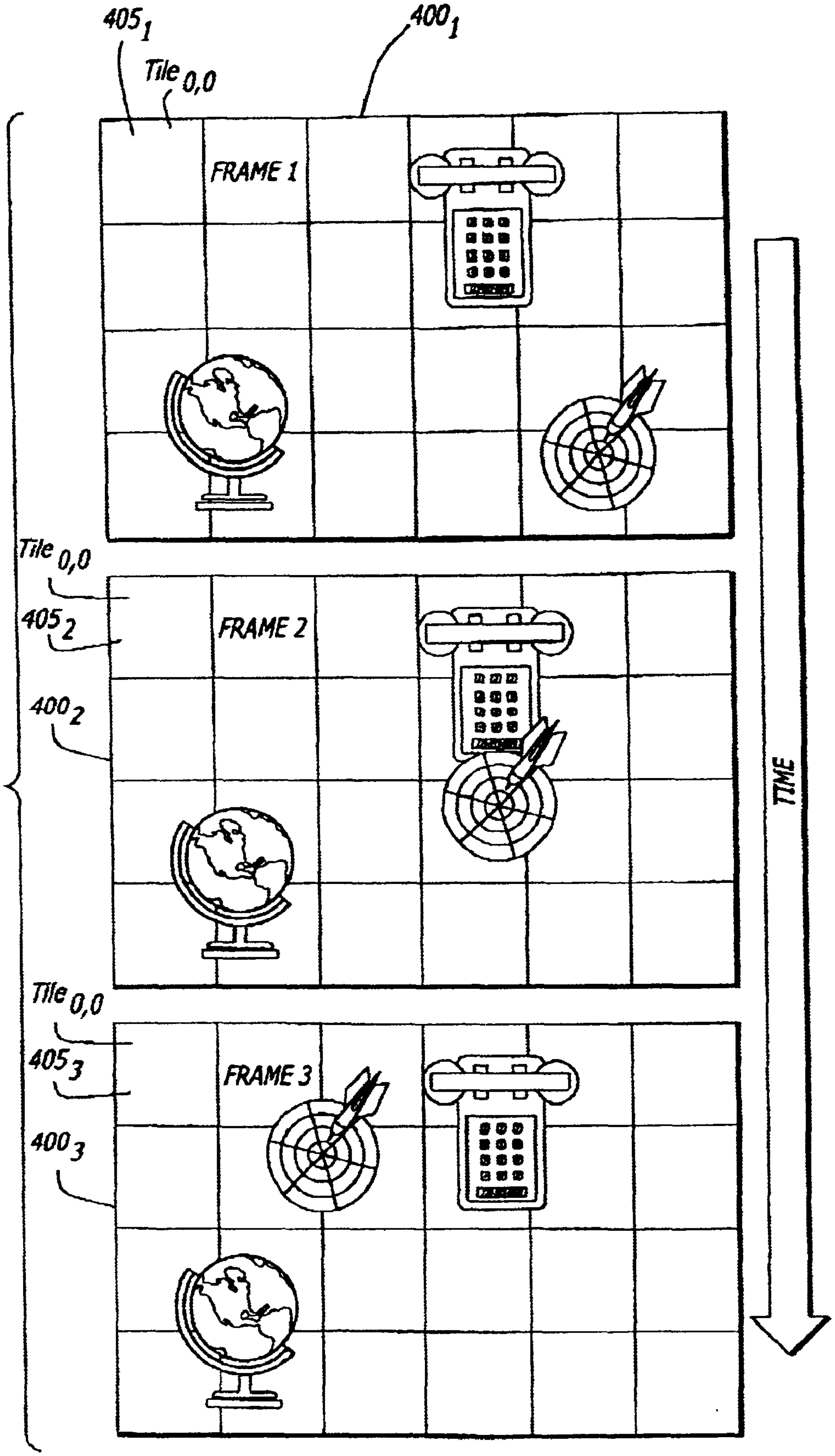
FIG. 4 illustrates the concept of temporal coherence.

In most image applications, temporal coherence occurs. Temporal coherence refers to the concept that over some period of time, the content of a majority of the tiles of image frames generated consecutively over time would typical remain the same. FIG. 4 illustrates the concept of temporal coherence. For example, tile (0,0) $\mathbf{405}_1$, $\mathbf{405}_2$, $\mathbf{405}_3$ remains unchanged from the first image frame $\mathbf{400}_1$, to the second image frame $\mathbf{400}_2$, and to the third image frame $\mathbf{400}_3$.

Accordingly, to improve the efficiency of the process of updating or refreshing the display or imaging device, display controller 120 (shown in FIGS. 1A and 1B) employs a process where only modified pages are sent to the imaging device for representation.

Figure 5:
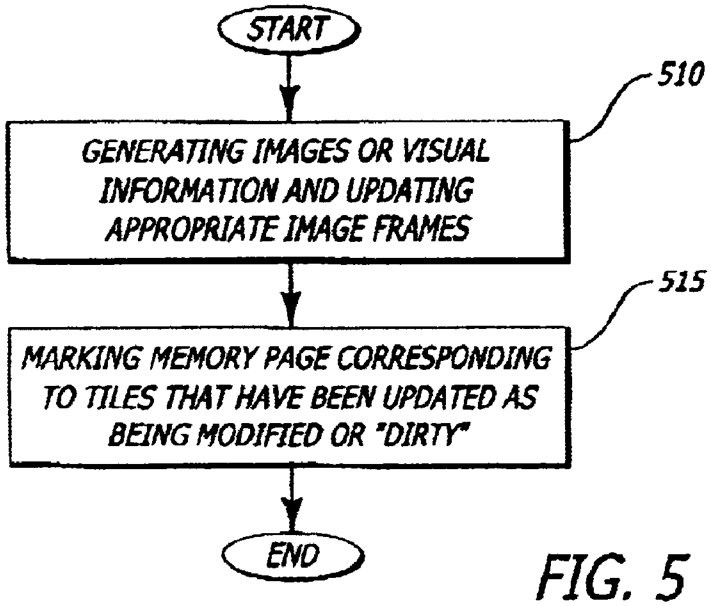
FIG. 5 is a flow diagram outlining the process of performing a drawing operation to fully or partially generate an image.

FIG. 5 is a flow chart outlining the process of performing a drawing operation. In block 510, images or visual information are generated, and the content of image frames used to store those generated images are updated. In block 515, memory pages corresponding to the tiles that have been updated due to the generation of the image or visual information are marked as being "modified" or "dirty".

Figure 6:
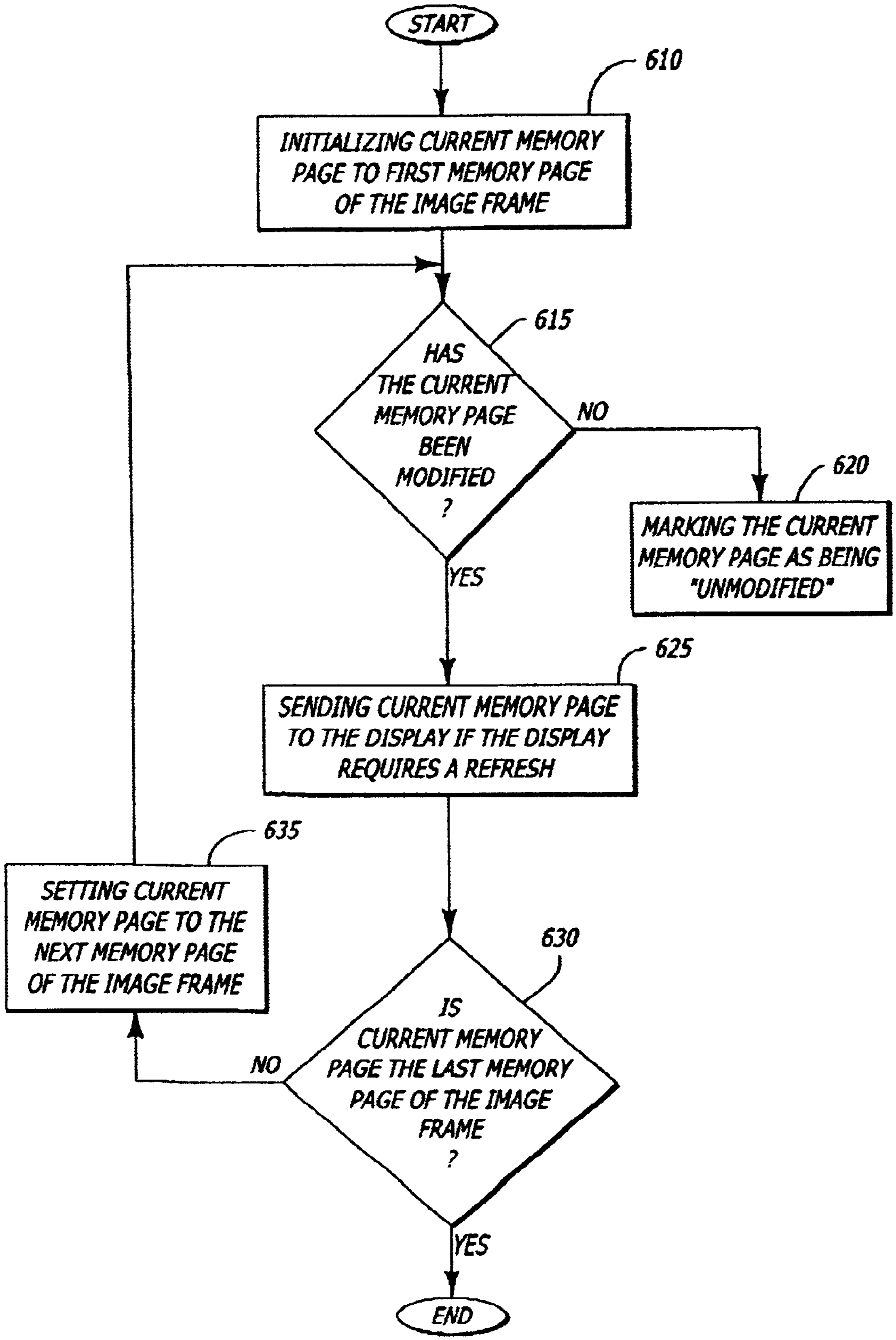
FIG. 6 is a flow chart outlining the process employed to refresh or update the imaging device or display.

FIG. 6 is a flow chart outlining the process employed to refresh or update the imaging device or display with only memory pages that have been modified, known as "dirty" memory pages. In block 610, the current memory page is initialized to be the first memory page of the image frame. In block 615, if the current memory page has been marked as "modified" by a drawing operation, as shown in FIG. 5 and described in the accompanying text, the current memory page is sent to the display or imaging device to be presented (block 620). The current memory page is then marked as "unmodified" (block 625). If the current memory page has not been marked as "modified", the memory page is sent to the display or imaging device only if the display or image device requires an update or refresh (block 630). In block 630, a query is performed to determine whether the last memory page of the image frame has been processed. If the last memory page of the image frame has not been processed, the current memory page is set equals to the next memory page in the image frame (block 635). The sequence of actions in blocks 615 to 625 are then repeated. If the last memory page of the image frame has been processed, the process of refreshing or updating the display or imaging device is then completed.

It should be noted that the functional components illustrated in FIGS. 1A and 1B and discussed above may be implemented in hardware or software. If the aforementioned functional components are implemented as a software program, the functionality of these components can be emulated by one or more sub-programs, which can be stored on a system-readable medium, such as floppy disk, hard drive, CD-ROM, digital video disk, tape, memory, or any storage device that is accessible by the system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system to refresh a display, the system comprising:

a memory to store images of an image frame in a plurality of memory pages, the image frame is divided into tiles representing two-dimensional regions of the image frame, each of the tiles is stored in one separate memory page;

a processor to perform drawing operations to generate the images for the image frame, the processor marking memory pages corresponding to regions of the image frame that have been updated while performing the drawing operations; and a display controller in communication with the memory to access the image frame and to send only the marked memory pages of the image frame to the display to refresh the display.

2. The system of claim 1, wherein each of the memory pages has a size of four Kilobytes.

3. The system of claim 1, wherein the image frame is represented by a configuration where color components of a pixel are deposited in contiguous memory locations.

4. The system of claim 1, wherein the image frame is represented by a configuration where color components of a pixel are separated and deposited in multiple color planes.

5. The system of claim 1, wherein the display controller sends the image frame one memory page at a time to the display to refresh the display.

6. A method to refresh a display, comprising:

storing at least one image frame such that content of the image frame is stored in a plurality of memory pages in a memory by dividing the image frame into tiles representing two-dimensional regions of the image frame and storing each of the tiles in one separate memory page;

marking memory pages corresponding to regions of the image frame that have been updated while performing drawing operations; and sending only the marked memory pages of the image frame to the display to refresh the display.

7. The method of claim 6 further comprises using memory pages of four Kilobytes in size.

8. The method of claim 6 further comprises organizing the image frame using a configuration where color components of a pixel are deposited in contiguous memory locations.

9. The method of claim 6, further comprises organizing the image frame using a configuration where color components of a pixel are separated and deposited in multiple color planes.

10. The method of claim 6, wherein the sending of the marked memory pages of the image frame to the display to refresh the display further comprises sending the marked memory pages one memory page at a time.

11. A program embodied on a system-readable medium to refresh a display, comprising:

a first sub-program to control storing at least one image frame in a memory such that content of the image frame is stored in a plurality of memory pages in the memory;

a second sub-program to mark memory pages corresponding to regions of the image frame that have been updated while performing drawing operations;

a third sub-program to divide the image frame into tiles representing regions of the image frame and to store each tile in a separate memory page; and at least one sub-program to access the image frame and to send only the marked memory pages of the image frame one memory page at a time to the display to refresh the display.

12. The program of claim 11 further comprising:

a third sub-program to organize the image frame using a configuration where color components of a pixel are deposited in contiguous memory locations.

13. The program of claim 11 further comprising:

a third sub-program to organize the image frame using a configuration where color components of a pixel are separated and deposited in multiple color planes.

* * * * *

UNITED STATES PATENT AND TRADEMARK OFFICE

CERTIFICATE OF CORRECTION

PATENT NO. : 6,943,801 B2
DATED : September 13, 2005
INVENTOR(S) : Rosenberg et al.

It is certified that error appears in the above-identified patent and that said Letters Patent is hereby corrected as shown below:

Title page,
Item [76], Inventors, delete "Sam" and insert -- Richard --.

Signed and Sealed this

Seventeenth Day of January, 2006

JON W. DUDAS
*Director of the United States Patent and Trademark Office*